United States Patent
Gaffney et al.

[11] Patent Number: 5,917,136
[45] Date of Patent: *Jun. 29, 1999

[54] CARBON DIOXIDE PRESSURE SWING ADSORPTION PROCESS USING MODIFIED ALUMINA ADSORBENTS

[75] Inventors: Thomas Richard Gaffney; Timothy Christopher Golden; Steven Gerard Mayorga, all of Allentown; Jeffrey Richard Brzozowski, Bethlehem; Fred William Taylor, Allentown, all of Pa.

[73] Assignee: Air Products and Chemicals, Inc., Allentown, Pa.

[ * ] Notice: This patent issued on a continued prosecution application filed under 37 CFR 1.53(d), and is subject to the twenty year patent term provisions of 35 U.S.C. 154(a)(2).

[21] Appl. No.: 08/725,593

[22] Filed: Oct. 3, 1996

Related U.S. Application Data

[63] Continuation-in-part of application No. 08/538,876, Oct. 4, 1995, Pat. No. 5,656,064.

[51] Int. Cl.[6] .................................................. B01D 53/047
[52] U.S. Cl. .................................... 95/98; 95/97; 95/104; 95/105; 95/139; 95/900
[58] Field of Search ................................ 95/96–98, 104, 95/105, 139, 900; 423/230, 231

[56] References Cited

U.S. PATENT DOCUMENTS

| | | | |
|---|---|---|---|
| 3,141,729 | 7/1964 | Clarke | 95/135 X |
| 3,232,028 | 2/1966 | McDonald et al. | 95/139 |
| 3,557,025 | 1/1971 | Emerson et al. | 252/463 |
| 3,627,478 | 12/1971 | Tepper | 423/230 |
| 3,865,924 | 2/1975 | Gidaspow et al. | 423/230 |
| 4,233,038 | 11/1980 | Tao | 95/139 X |
| 4,249,915 | 2/1981 | Sircar et al. | 55/26 |
| 4,264,340 | 4/1981 | Sircar et al. | 95/139 X |
| 4,433,981 | 2/1984 | Slaugh et al. | 55/59 |
| 4,477,264 | 10/1984 | Kratz et al. | 55/25 |
| 4,477,267 | 10/1984 | Reiss | 95/139 |
| 4,493,715 | 1/1985 | Hogan et al. | 55/68 |
| 4,711,645 | 12/1987 | Kumar | 95/139 X |
| 4,795,735 | 1/1989 | Liu et al. | 95/139 X |
| 4,855,276 | 8/1989 | Osborne et al. | 423/230 X |
| 4,888,157 | 12/1989 | Carnell et al. | 423/230 |
| 4,937,059 | 6/1990 | Kolts et al. | 423/230 |
| 5,030,610 | 7/1991 | Sakata et al. | 95/139 X |
| 5,186,727 | 2/1993 | Chang | 95/139 X |
| 5,232,474 | 8/1993 | Jain | 55/26 |
| 5,480,625 | 1/1996 | Nalette et al. | 95/139 X |

FOREIGN PATENT DOCUMENTS

| | | | |
|---|---|---|---|
| 0111911 | 6/1984 | European Pat. Off. | 95/139 |
| 61-157322 | 7/1986 | Japan | 95/139 |
| 63-107720 | 5/1988 | Japan | 95/139 |
| 2-075318 | 3/1990 | Japan | 95/139 |
| 62-0775318 | 3/1990 | Japan | 95/139 |
| 4-200742 | 7/1992 | Japan | 423/230 |
| 5-049918 | 3/1993 | Japan | 423/230 |

*Primary Examiner*—Robert Spitzer
*Attorney, Agent, or Firm*—Keith D. Gourley

[57] ABSTRACT

A pressure swing adsorption process for absorbing $CO_2$ from a gaseous mixture containing $CO_2$ comprising introducing the gaseous mixture at a first pressure into a reactor containing a modified alumina adsorbent maintained at a temperature ranging from 100° C. and 500° C. to adsorb $CO_2$ to provide a $CO_2$ laden alumina adsorbent and a $CO_2$ depleted gaseous mixture and contacting the $CO_2$ laden adsorbent with a weakly adsorbing purge fluid at a second pressure which is lower than the first pressure to desorb $CO_2$ from the $CO_2$ laden alumina adsorbent. The modified alumina adsorbent which is formed by depositing a solution having a pH of 3.0 or more onto alumina and heating the alumina to a temperature ranging from 100° C. and 600° C., is not degraded by high concentrations of water under process operating conditions.

18 Claims, 1 Drawing Sheet

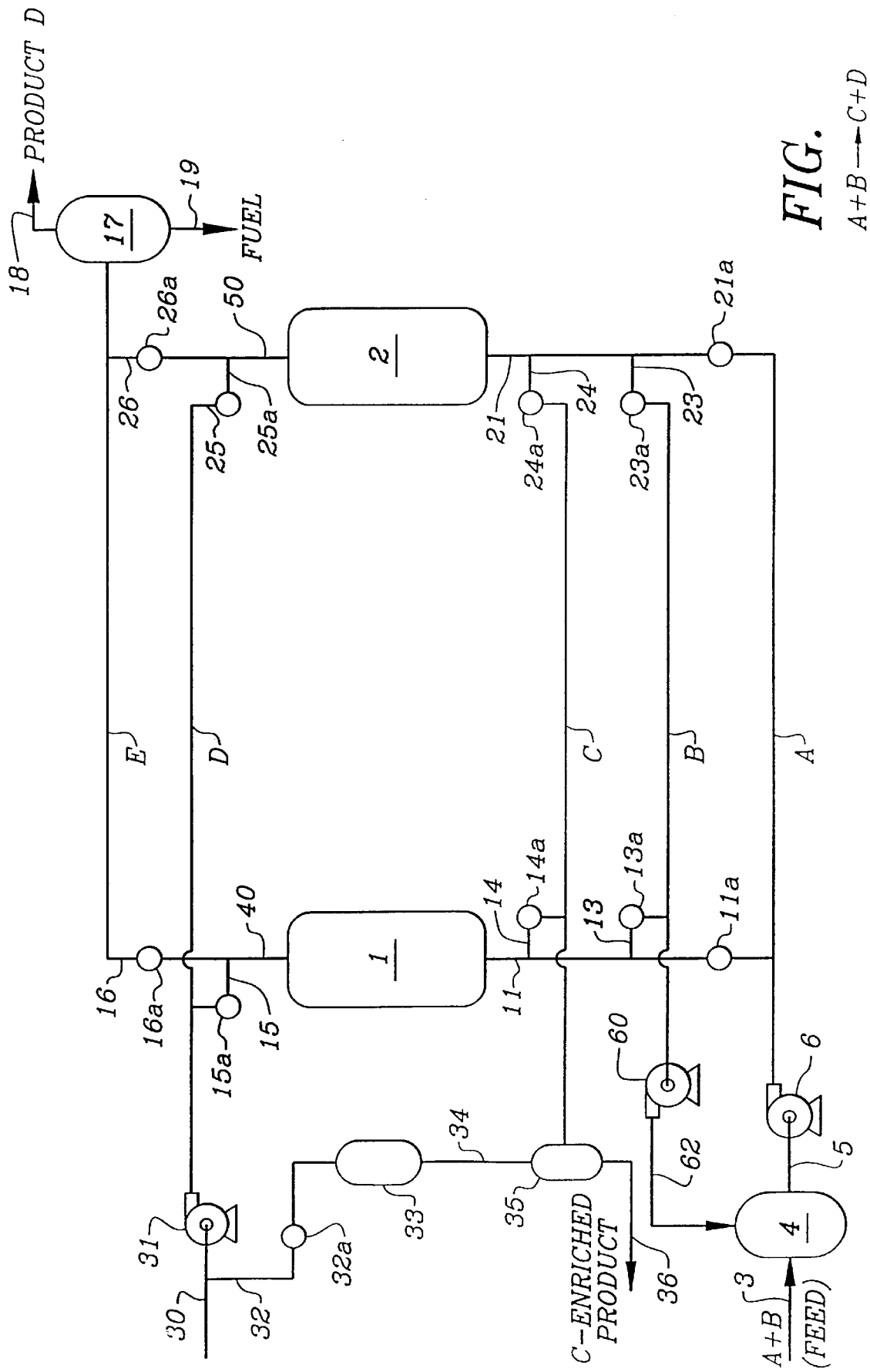

5,917,136

CARBON DIOXIDE PRESSURE SWING ADSORPTION PROCESS USING MODIFIED ALUMINA ADSORBENTS

CROSS-REFERENCE TO RELATED APPLICATIONS

This application is a continuation-in-part to copending U.S. patent application Ser. No. 08/538,876, filed Oct. 4, 1995, which issued as U.S. Pat. No. 5,656,064 on Aug. 12, 1997, the Specification and claims which are incorporated by reference and made a part of this application.

STATEMENT REGARDING FEDERALLY SPONSORED RESEARCH OR DEVELOPMENT

The subject matter presented in this patent application was funded in part by the United States Department of Energy (DOE) under Cooperative Agreement No. DE-FC36-95GO10059. The DOE may possess certain rights under the claims appended hereto.

TECHNICAL FIELD OF THE INVENTION

The invention relates to the field of pressure swing adsorption (PSA) and provides PSA processes for separating carbon dioxide ($CO_2$) from gaseous mixtures containing $CO_2$. The PSA process is operated in one or more reactors containing a modified alumina adsorbent maintained at a temperature ranging from 100° C. to 500° C. wherein $CO_2$ is reversibly adsorbed on the alumina adsorbent.

BACKGROUND OF THE INVENTION

Before air can be introduced into a cryogenic air separation process in which oxygen and nitrogen are separated from one another, $CO_2$ present in the air at low levels (eg. 400 ppm) must be removed in order to avoid $CO_2$ from solidifying in the air separation plant. Two methods generally used for such $CO_2$ removal are temperature swing adsorption (TSA) and pressure swing adsorption (PSA).

In each of these techniques, a bed of adsorbent is exposed to a flow of feed air for a period to adsorb $CO_2$ from the air. Thereafter, the flow of feed air is shut off from the adsorbent bed and the adsorbent is exposed to a flow of purge gas which strips the adsorbed $CO_2$ from the adsorbent and regenerates it for further use. In TSA, the $CO_2$ is driven off from the adsorbent by heating the adsorbent in the regeneration phase. In PSA, the pressure of the purge gas is lower than that of the feed gas and the change in pressure is used to remove the $CO_2$ from the adsorbent.

Other components can be removed from the feed air by these processes, including hydrocarbons and water. These adsorption techniques can also be applied to feed gases other than air or to air to be purified for purposes other than use in an air separation plant.

The use of PSA for removing $CO_2$ from air prior to separating air into its respective components by cryogenic air separation is described in numerous publications, eg. U.S. Pat. No. 4,249,915 and U.S. Pat. No. 4,477,264. Conventional processes employed a dual bed of alumina for water removal followed by a zeolite such as 13x for $CO_2$ removal. More recently, all alumina PSA systems have been proposed, as described in U.S. Pat. No. 5,232,474. The advantages of an all alumina system include lower adsorbent cost, vessel design which does not need screens to separate the two different adsorbents and better thermal stability in the adsorption vessel during blow down and repressurization. It would be desirable however to develop adsorbents having an improved $CO_2$ capacity so as to allow smaller bed sizes with lower capital costs and less void gas being lost during depressurization, ie. higher air recoveries.

Alumina is also used as an adsorbent in TSA and for this purpose it has been proposed to treat the alumina to form alkali metal oxides thereon to increase the adsorptive capacity of the alumina. By way of example U.S. Pat. No. 4,493,715 teaches a method for removing $CO_2$ from olefin streams by contacting the feed gas with a regenerable, calcined adsorbent consisting of essentially from 1 to 6 wt % of an alkali metal oxide selected from the group consisting of sodium, potassium and lithium on alumina. The adsorbent was prepared by contacting alumina with an alkali metal compound which is convertible to the metal oxide on calcination.

U.S. Pat. No. 4,433,981 describes a process for removing $CO_2$ from a gaseous stream which comprises contacting the gas stream at a temperature up to about 300° C. with an adsorbent prepared by impregnation of a porous alumina with a sodium or potassium oxide. The corresponding oxide can be prepared by impregnation with a decomposable salt and calcining at a temperature of 350° to 850° C. Salts mentioned include alkali metal bicarbonates.

U.S. Pat. No. 3,557,025 teaches a method for producing alkalized alumina which is capable of adsorbing $SO_2$. The adsorbent is prepared by selectively calcining the alumina, and contacting with an alkali or ammonium bicarbonate salt to form at least 30% by weight alkalized alumina having the empirical formula of $MAl(OH)_2CO_3$.

U.S. Pat. No. 3,865,924 describes the use of a finely ground mixture of potassium carbonate and alumina as an absorbent for $CO_2$, which reacts with the carbonate and water to form bicarbonate. The absorbent mixture is regenerated by mild heating, eg. at 93° C. (200° F.). The presence of stoichiometric quantities of water is essential and the alumina appears to be regarded as essentially a mere carrier for the potassium carbonate. Other carbonates may be used.

U.S. Pat. No. 5,232,474 discloses a PSA process using alumina in 70–100% of the bed volume to remove water and $CO_2$ from air. Preference is expressed for alumina containing up to 10 wt. % silica as opposed to the generality of aluminas which typically contain only about 1 % silica. Silica is an acidic material and the use of basic compounds to increase $CO_2$ capacity as proposed herein is therefore contrary to the teaching of this document.

Those skilled in the art continue to search for adsorbents suitable for use in PSA processes which provide improved $CO_2$ adsorption capacity and which can be regenerated under PSA operating conditions. Moreover, those skilled in the art are searching for improved $CO_2$ adsorbents which can be used in PSA processes which are integrated with other processes wherein adsorption of $CO_2$ onto the adsorbent and regeneration of the adsorbent are accomplished at temperatures often substantially higher than ambient temperature.

BRIEF SUMMARY OF THE INVENTION

Copending U.S. patent application Ser. No. 08/538,876, which has been assigned to the assignee of the present invention, presents a PSA process for adsorbing $CO_2$ from a gaseous mixture containing $CO_2$ wherein an adsorbent formed by impregnating alumina with a basic solution having a pH of 9 or more is used to adsorb $CO_2$ from the gaseous mixture. The $CO_2$ laden alumina adsorbent is periodically regenerated by reducing the pressure to which the adsorbent is exposed to a pressure lower than the first pressure.

Copending U.S. patent application Ser. No. 08/624,147 which is also assigned to the assignee of the present invention, presents a cyclic process for operating equilibrium controlled reactions in a system which comprises a plurality of reactors containing a catalyst for the reaction and an adsorbent which selectively adsorbs a desired product formed during the reaction over other reaction products. The cyclic process utilizes a PSA cycle to desorb the more adsorbable product from the adsorbent which is laden with the more adsorbable product. Thus, the reaction step and the PSA cycle are conducted in the same reactor wherein the PSA cycle must be performed at the temperature at which the chemical reaction is conducted. Therefore, the PSA cycle is performed at temperatures substantially higher than those typically practiced in conventional PSA processes wherein the feedstock to be separated may contain substantial amounts of water.

Applicants have discovered that the alumina adsorbents presented in copending U.S. patent application Ser. No. 08/538,876 (the "876 application") can be utilized in PSA processes which are conducted at elevated temperatures ranging from 100° C. to 500° C., provided such alumina adsorbents are prepared according to the procedures enumerated in the present invention. Moreover, Applicants have discovered that with respect to PSA processes for selectively adsorbing $CO_2$ from gaseous mixtures containing $CO_2$ which are operated at temperatures ranging from 100° C. to 500° C., alumina adsorbents which have high adsorptive capacity and resistance to water can be prepared by a procedure which diverges from the teachings of the copending '876 application.

The alumina adsorbents of the '876 application are prepared by impregnating alumina with a basic solution having a pH of 9 or more which are suitable for use in conventional PSA processes. Applicants have discovered a new class of alumina adsorbents which are prepared by depositing a solution having a pH of 3.0 or more onto alumina and heating the alumina to a temperature ranging from 100° C. to 600° C. wherein the resulting alumina adsorbents are particularly suited toward use as $CO_2$ adsorbents in PSA processes which are operating at temperatures ranging from 100° C. to 500° C. These alumina adsorbents demonstrate high $CO_2$ capacity at elevated temperatures and are not deactivated by the presence of water or steam at such elevated temperatures. Therefore, Applicants have discovered that suitable alumina adsorbents can be prepared by depositing acidic solutions having a pH of 3.0 or greater as well as basic solutions provided the alumina is heated to a temperature of 100° C. to 600° C.

Thus, the present invention presents a PSA process for absorbing $CO_2$ from a gaseous mixture having a first $CO_2$ partial pressure comprising introducing the gaseous mixture into a reactor containing an alumina adsorbent maintained at a temperature ranging from 100° C. and 500° C. to adsorb $CO_2$ to provide a $CO_2$ laden alumina adsorbent and a $CO_2$ depleted gaseous mixture and contacting the $CO_2$ laden adsorbent with a weakly adsorbing purge fluid having a second $CO_2$ pressure which is lower than the first $CO_2$ partial pressure to desorb $CO_2$ from the $CO_2$ laden alumina adsorbent wherein the alumina adsorbent is formed by depositing a solution having a pH of 3.0 or more onto alumina and heating the alumina to a temperature ranging from 100° C. and 600° C.

The first step of the PSA process comprises introducing the gaseous mixture containing $CO_2$ into a reactor containing the desired alumina adsorbent wherein the reactor is maintained at a temperature ranging from 100° C. to 500° C. The $CO_2$ is selectively adsorbed onto the alumina adsorbent and a $CO_2$ depleted stream is withdrawn from the reactor. Suitable reactors include conventional isothermal fixed bed reactors and tube and shell reactors.

The second step of the PSA process comprises desorbing $CO_2$ from the $CO_2$ laden alumina adsorbent residing in the reactor so that another process cycle can be completed. This step is accomplished by contacting the $CO_2$ laden adsorbent with a weakly adsorbing purge fluid with respect to the adsorbent which displaces the $CO_2$ from the alumina. Suitable weakly adsorbing purge fluids include an inert gas such as methane, nitrogen, hydrogen, helium and argon as well as the $CO_2$ depleted gaseous mixture which has been withdrawn from each reactor.

The PSA process of the present invention can be successfully utilized to separate $CO_2$ from any gaseous mixture which contains $CO_2$ even if such mixture contains substantial amounts of water or steam. The claimed PSA process is particularly suited toward use in removing $CO_2$ from gaseous mixtures containing up to 20,000 ppm $CO_2$.

The claimed PSA process is well suited for the bulk removal of $CO_2$ from any hot flue gas which contains $CO_2$. The PSA process is operated at an elevated temperature, typically the temperature of the flue gas source to remove most of the $CO_2$ which is a greenhouse gas. This PSA application overcomes the need to cool the flue gas to ambient temperature prior to removing $CO_2$.

The claimed PSA process can also be utilized to produce an inert gas such as nitrogen using a conventional inert gas generator where $CH_4$ is burnt using ambient air for removal of $O_2$. The product gas primarily contains $N_2$, $H_2O$ and $CO_2$. The claimed PSA process is utilized to remove $CO_2$ at elevated temperature followed by condensation of water to produce the acid gas free inert gas.

In a preferred embodiment, the PSA process is used to adsorb $CO_2$ which is a product of steam methane reformation (SMR) wherein methane, or optionally, natural gas, and water are reacted in the presence of a SMR catalyst to produce an SMR effluent containing primarily $CO_2$, $H_2O$, CO and $H_2$. A particularly preferred embodiment of the SMR application utilizes the process presented in copending U.S. patent application Ser. No. 08/624,147, the specification which is incorporated by reference herein.

Alumina adsorbents suitable for use in this high temperature PSA process are made by depositing onto alumina a solution having a pH of 3 or greater of a compound comprising a cation selected from an alkali metal, an alkaline earth metal or ammonium and an anion selected from an hydroxide, a carbonate, a bicarbonate, an acetate, a phosphate, a nitrate or an organic acid salt.

Preferred alkali metal cations of the compound in solution is selected from the group consisting of lithium, sodium, potassium, cesium and rubidium. Preferred alkaline earth metal cations of the compound in solution is selected from the group consisting of calcium, strontium and barium.

Preferred solutions to be deposited onto alumina include solutions having a pH of 3.0 or greater of a compound selected from the group consisting of $Ca(NO_3)_2$, $NaNO_3$, $NaCH_3CO_2$, $KNO_3$, $Sr(NO_3)_2$, $LiNO_3$, $K_2CO_3$ and $LiCH_3CO_2$.

The solutions of the enumerated compounds having a pH of 3.0 or greater can be deposited onto the alumina using any conventional technique including impregnation, vapor phase deposition, dip coating and spraying.

BRIEF DESCRIPTION OF THE DRAWING

The FIGURE presents a schematic of a process for operating equilibrium controlled reactions which incorporates the PSA process of the present invention wherein two reactors contain an admixture of catalyst and the claimed alumina adsorbent. The claimed PSA process is employed in order to separate $CO_2$ formed during the process from a gaseous mixture containing $CO_2$.

DETAILED DESCRIPTION OF THE INVENTION

The present invention presents a PSA process for absorbing $CO_2$ from a gaseous mixture having a first $CO_2$ partial pressure comprising introducing the gaseous mixture into a reactor containing an alumina adsorbent maintained at a temperature ranging from 100° C. and 500° C. to adsorb $CO_2$ to provide a $CO_2$ laden alumina adsorbent and a $CO_2$ depleted gaseous mixture and contacting the $CO_2$ laden adsorbent with a weakly adsorbing purge fluid having a second $CO_2$ pressure which is lower than the first $CO_2$ partial pressure to desorb $CO_2$ from the $CO_2$ laden alumina adsorbent wherein the alumina adsorbent is formed by depositing a solution having a pH of 3.0 or more onto alumina and heating the alumina to a temperature ranging from 100° C. and 600° C. Optionally, the heating step can be performed in-situ by adding the alumina adsorbent onto which the enumerated solutions having been deposited into the reactor and bring the reactor to process temperature.

The first step of the PSA process comprises introducing the gaseous mixture containing $CO_2$ into a reactor containing the desired alumina adsorbent wherein the reactor is maintained at a temperature ranging from 100° C. to 500° C. wherein the $CO_2$ is selectively adsorbed onto the alumina adsorbent and a $CO_2$ depleted stream is withdrawn from the reactor.

The second step of the PSA process comprises desorbing $CO_2$ from the $CO_2$ laden alumina adsorbent residing in the reactor so that another process cycle can be completed. This step is accomplished by contacting the $CO_2$ laden adsorbent with a weakly adsorbing purge fluid with respect to the adsorbent which displaces the $CO_2$ from the alumina. Suitable weakly adsorbing purge fluids include an inert gas such as methane, nitrogen, hydrogen, helium and argon as well as the $CO_2$ depleted gaseous mixture which has been withdrawn from each reactor. For purposes of this invention, an "inert gas" means a gas which will not react with, or irreversibly adsorb to the alumina adsorbent.

The term, weakly adsorbing purge fluid, refers to a fluid which is capable of displacing $CO_2$ which is adsorbed by the alumina adsorbent during operation of the claimed PSA process and which can then be desorbed prior to conducting subsequent process cycles in each reactor. One of ordinary skill in the art can readily select one or a mixture of weakly adsorbing purge fluids suitable for use in the claimed invention. The $CO_2$ partial pressure of the weakly adsorbing purge fluid must be lower than the $CO_2$ partial pressure of the gaseous mixture containing $CO_2$ which is separated by the claimed PSA process.

The embodiments of the claimed PSA process can be operated using conventional hardware. For example, suitable reactors include any vessel which is capable of being subjected to the process conditions required to practice the invention including shell and tube reactors. Moreover, such reactors can be readily selected by one of ordinary skill in the art based upon considerations such as the particular mixtures to be separated, the volume of fluids to be separated and the like.

The PSA process of the present invention can be successfully utilized to separate $CO_2$ from any gaseous mixture which contains $CO_2$ even if such mixture contains substantial amounts of water or steam. The process is particularly suited toward use in removing $CO_2$ from gaseous mixtures containing up to 20,000 ppm $CO_2$.

The claimed PSA process is well suited for the bulk removal of $CO_2$ from any hot flue gas which contains $CO_2$. The PSA process is operated at an elevated temperature typically the temperature of the flue gas source to remove most of the $CO_2$ which is a greenhouse gas. This PSA application overcomes the need to cool the flue gas to ambient temperature prior to removing $CO_2$.

The claimed PSA process can also be utilized to produce an inert gas such as nitrogen using a conventional inert gas generator where $CH_4$ is burnt using ambient air for removal of $O_2$. The product gas primarily contains $N_2$, $H_2O$ and $CO_2$. The claimed PSA process is utilized to remove $CO_2$ at elevated temperature followed by condensation of water to produce the acid gas free inert gas. Alternately, a nitrogen rich gaseous mixture which contains trace amounts of oxygen can be further purified by combusting the oxygen with $CH_4$ to form $CO_2$ and $H_2O$ wherein the $CO_2$ is removed by the claimed PSA process.

The PSA process can also be used to adsorb $CO_2$ which is the product of steam methane reformation (SMR) wherein $CH_4$ and water are reacted in the presence of an SMR catalyst to produce an SMR effluent containing primarily $CO_2$, $H_2O$, CO and $H_2$. The PSA process of the present invention is operated at elevated temperature (100°–500° C.) to remove $CO_2$ from the hot SMR effluent to produce a wet $CO$:$H_2$ mixture. The water can then be removed by condensation and conventional drying. Conventional adsorbents such as activated carbons and zeolites operated at elevated process temperatures do not offer reversible adsorption of substantial quantities of $CO_2$ when large amounts of water or steam are present in the gaseous mixture to be separated. A preferred embodiment of the SMR application which utilizes the claimed PSA process is presented in copending U.S. patent application Ser. No. 08/624,147 shall be discussed in greater detail under the heading "Preferred Embodiment of the Invention".

Alumina adsorbents suitable for use in this high temperature PSA process are made by depositing onto alumina a solution having a pH of 3 or greater of a compound comprising a cation selected from an alkali metal, an alkaline earth metal or ammonium and an anion selected from an hydroxide, a carbonate, a bicarbonate, an acetate, a phosphate, a nitrate or an organic acid salt.

Preferred alkali metal cations of the compound in solution are selected from the group consisting of lithium, sodium, potassium, cesium and rubidium. Preferred alkaline earth metal cations of the compound in solution are selected from the group consisting of calcium, strontium and barium.

Preferred solutions to be deposited onto alumina include solutions having a pH of 3.0 or greater of a compound selected from the group consisting of $Ca(NO_3)_2$, $NaNO_3$, $NaCH_3CO_2$, $KNO_3$, $Sr(NO_3)_2$, $LiNO_3$, $K_2CO_3$ and $LiCH_3CO_2$.

The solutions of the enumerated compounds having a pH of 3.0 or greater can be deposited onto the alumina using any conventional technique including impregnation, vapor phase deposition, dip coating and spraying. A representative method comprises making a solution of the chosen basic compound having an appropriate pH as described above and adding the solution to an alumina in a volume just sufficient to fill the pores of the alumina without producing surface wetness.

The concentration and the amount of the solution may be chosen to produce a loading of the compound onto the alumina of from 1 to 40% on a dry weight basis, preferably from 5 to 25% on a dry weight basis. Alternately, these solutions may be deposited onto the alumina by conventional spraying or coating techniques. Optionally, the alumina adsorbent can be prepared by a solid phase technique where the enumerated compounds are deposited directly onto the alumina and heated as described.

PREFERRED EMBODIMENT OF THE INVENTION

A preferred embodiment for practicing the claimed invention is presented in the FIGURE, wherein the PSA process is integrated into a combined cycle for conducting a chemical reaction in which a gaseous mixture containing $CO_2$ is produced as a product and wherein such process utilizes the claimed PSA process to separate $CO_2$ from the product mixture. The integrated combined cycle utilizes two reactors each containing an admixture of catalyst and an alumina adsorbent of the present invention for selectively adsorbing $CO_2$. The schematic according to the FIGURE consists of reactors 1 and 2; numerous control valves; manifolds A through E; pumps 6, 31 and 60; separators 17 and 35; and storage tanks 4 and 33. A gaseous mixture containing $CO_2$ is to be subjected to the desired equilibrium controlled reaction is drawn from storage tank 4 having inlet line 3 and outlet line 5 via pump 6 wherein the pressurized feedstock is introduced into manifold A.

Manifold A is in flow communication with branch inlet lines 11 and 21 which are connected to the inlet ends of reactors 1 and 2. Lines 11 and 21 are equipped with valves 11a and 21a, respectively. Opening of the appropriate valve permits the pressurized feedstock to flow through manifold A into the selected reactor being initially placed on stream. Thus, by opening valve 11a, while valve 21a is closed, feedstock may be caused to flow from manifold A, through line 11 and into reactor 1.

Reactors 1 and 2 are fitted at their respective outlet ends with lines 40 and 50 respectively, each equipped with control valves 16a and 26a, respectively. Lines 40 and 50 are operatively connected to manifold E via lines 16 and 26 through which a stream containing a mixture of components withdrawn from reactors 1 and 2 can be collected in separator 17. The mixture can be separated such that a stream flow from the corresponding reactor through lines 40 and 16 or lines 50 and 26 into manifold E for passage into separator 17.

Reactors 1 and 2 are operatively connected to lines 11 and 21, each of which is in flow communication with lines 13 and 23. Lines 13 and 23 are provided with control valves 13a and 23a, respectively, such lines being in flow communication with manifold B. Manifold B can be placed in flow communication with reactor 1 or 2 via lines 13 and 23 upon opening valve 13a or 23a, respectively. Manifold B is also in flow communication with pump 60 which is connected to line 62 which can be used to recycle feedstock to storage tank 4.

Manifold C is in flow communication with reactors 1 and 2 via lines 14 and 24, each line which is equipped with valves 14a and 24a, respectively. Reactor effluent from reactors 1 and 2 may be passed through lines 14 and 24 into manifold C for separation in separator 35 into a stream 36 which is enriched in $CO_2$, referred to as Product C, and a stream comprising weakly adsorbing purge fluid which can be passed into storage tank 33 via line 34 for later use.

Manifold D is connected to pump 31 which receives various process fluids via lines 30 and 32. Such process fluids pass through line 30 or line 32 and are pressurized via pump 31. The pressurized fluids may be passed through manifold D which is in flow communication with reactors 1 and 2 via lines 15 and 25, respectively. Lines 15 and 25 are each fitted with valves 15a and 25a such that the flow of streams from Manifold D into reactors 1 and 2 can be controlled. Moreover, weakly adsorbing purge fluid from tank 33 can be transferred to pump 31 via lines 32 and 30 by opening valve 32a.

Operation of the embodiment represented in the FIGURE will now be explained in connection with an arbitrarily chosen cycle having eight timed periods of ten minutes per period as set forth in Table 1. Although not limited thereto, the process as illustrated in the FIGURE utilizes two reactors which are operated in cycle according to a predetermined timed sequence. Other arrangements using fewer or a greater number of reactors and the associated gas manifolds and switch valves may be employed, optionally using interrupted or discontinuous operation (using idling) of pumps. Other arrangements using more than two reactors may be employed by appropriate sequencing of the individual steps or periods of the process cycle.

TABLE 1

| | | Mode I | | | | | | | | | | | | |
|---|---|---|---|---|---|---|---|---|---|---|---|---|---|---|
| STEPS | TIME Minutes | 11a | 13a | 14a | 15a | 16a | 32a | 21a | 23a | 24a | 25a | 26a | 32a | STEPS Reactor-Sorber II |
| Sorpreaction | 0 to 10 | O | C | C | C | O | C | C | O | C | C | C | C | Depressurize |
| Sorpreaction | 10 to 20 | O | C | C | C | O | C | C | C | O | O | C | C | Purge I |
| Sorpreaction | 20 to 30 | O | C | C | C | O | C | C | C | O | O | C | C | Purge II |
| Sorpreaction | 30 to 40 | O | C | C | C | O | C | C | C | C | O | C | C | Pressurize |
| Depressurize | 40 to 50 | O | O | C | C | C | C | O | C | C | C | O | C | Sorpreaction |
| Purge I | 50 to 60 | C | C | O | O | C | C | O | C | C | C | O | C | Sorpreaction |
| Purge II | 60 to 70 | C | C | O | O | C | C | O | C | C | C | O | C | Sorpreaction |
| Pressurize | 70 to 80 | C | C | C | O | C | C | O | C | C | C | O | C | Sorpreaction | containing the less adsorbable product, referred to as Product D, can be collected via line 18 and residuals may be collected via line 19 for fuel value or recycle. Thus, by opening the appropriate valve 16a or 26a, a mixture containing the less adsorbable product, product D, is caused to According to the general embodiment of the FIGURE, each of the reactors 1 and 2 undergo four periods of the reaction/adsorption step, referred to as the sorpreaction step, one period of the depressurization step, one period of the Purge I step, one period of the Purge II step, and one period of the pressurization step. Thus, the process integration presented in the FIGURE utilizes the same reactor to perform the chemical process in which $CO_2$ is formed and to separate such $CO_2$ from the resulting product mixture.

Thus, the PSA process of the present invention is practiced during the sorpreaction step wherein $CO_2$ is produced and simultaneously adsorbed by the alumina adsorbents of the present invention. The second step of contacting the $CO_2$ laden alumina adsorbent with a weakly adsorbing fluid in order to desorb $CO_2$ from the adsorbent is practiced in the Purge steps. As illustrated in Table 1, the steps undertaken at startup in each of reactors 1 and 2 are staggered to enable at least one of the two reactors to undergo the sorpreaction step at all times during the process cycle. The operation of the invention described in the FIGURE involves principally the following sequence of steps:

(a) SORPREACTION—feedstock at a first predetermined pressure is passed through the reactor containing an admixture of catalyst and the modified alumina adsorbents of the present invention which are preferentially selective toward retention of $CO_2$, referred to as Product C, wherein an effluent stream enriched in the less adsorbable product, referred to as Product D, is withdrawn from the reactor. $CO_2$ is selectively adsorbed by the alumina adsorbent and a reaction mass transfer zone (RMTZ) is formed inside the reactor which moves toward the outlet or discharge end of the reactor as more feedstock is passed through the reactor. The adsorbent at the leading edge of the RMTZ is essentially free of $CO_2$ while the trailing edge of the RMTZ is equilibrated with $CO_2$ at the local conditions. The sorpreaction step is continued until the alumina adsorbent in the reactor is essentially saturated with $CO_2$. The effluent gas, Product D, which is depleted in $CO_2$ is discharged from the reactor.

(b) DEPRESSURIZATION—the reactor is countercurrently depressurized to a second predetermined pressure by withdrawing a mixture comprising unreacted feedstock, a portion of $CO_2$ and a portion of the less adsorbable product. The depressurization step is continued until the reactor reaches the second predetermined pressure.

(c) PURGE I—the reactor is countercurrently purged at the second pressure with a weakly adsorbing purge fluid with respect to the adsorbent to desorb $CO_2$ from the alumina adsorbent and a mixture comprising unreacted feedstock, a portion of $CO_2$ and a portion of Product D is withdrawn from the reactor.

(d) PURGE II—the reactor is countercurrently purged at the second pressure with Product D to desorb the weakly adsorbing purge fluid and a mixture comprising the weakly adsorbing purge fluid, a portion of $CO_2$ and a portion of Product D is withdrawn from the reactor.

(e) PRESSURIZATION—the reactor is countercurrently pressurized from the second pressure to the first pressure with Product D prior to commencing another process cycle within the reactor.

The valve positions during the above-mentioned operating cycle are also set forth in Table 1. The designation "O" indicates that a specified valve is open while a "C" represents that a specified valve is closed. The operative sequence of steps occurring in reactor 1 during a complete process cycle will now be described in exhaustive detail so that operation of a continuous process will be fully understood. The identical sequence of steps according to Table 1 occurs in staggered sequence in reactor 2.

Again, referring to the embodiment disclosed in the FIGURE and the sequence periods and valve positions designated in Table 1, reactor 1 undergoes four sequence periods of the sorpreaction step. Feedstock comprising reactants A and B, stored in storage tank 4, is introduced into reactor 1 by opening valves 11a and 16a and closing valves 13a, 14a and 15a thereby allowing feedstock to flow through manifold A, line 11 and into reactor 1 which contains an admixture of a desired catalyst and a modified alumina adsorbent of the present invention which is preferentially selective toward $CO_2$ (Product C).

The sorpreaction is continued until reactor 1 is essentially saturated with adsorbed $CO_2$. $CO_2$ is selectively adsorbed onto the alumina adsorbent and a reaction mass transfer zone (RMTZ) is formed within reactor 1 which moves toward the discharge end of reactor 1 as more feedstock is passed. The sorpreaction is completed when the MTZ reaches the effluent end of the reactor or somewhat short of it by a predetermined set point. Thus, the first step of the claimed PSA process has been completed wherein $CO_2$ has been selectively adsorbed from the product of the equilibrium controlled reaction comprising a gaseous mixture containing $CO_2$.

A mixture which is enriched in the less adsorbable product and depleted in $CO_2$ as well as unreacted feedstock exits the discharge end of reactor 1 via lines 40 and 16 and flows into manifold E for collection in separator 17. Optionally, the mixture in separator 17 can be separated by conventional techniques such as pressure swing adsorption, thermal swing adsorption or distillation or condensation to form a stream comprising the less adsorbable product, Product D, which is discharged from separator 17 via line 18 and the remainder of the components of the mixture are discharged via line 19.

The process proceeds with one period of the depressurization step wherein reactor 1 is countercurrently depressurized to a second predetermined pressure by withdrawing a mixture comprising unreacted feedstock, a portion of $CO_2$ and a portion of the less adsorbable product from the inlet end of reactor 1. Valve 13a is opened while valves 11a and 14a remain closed allowing the mixture to be passed through lines 11 and 13 into manifold B and in flow communication with pump 60. The mixture exits the discharge end of pump 60 proceeding via line 62 for use as fuel (not shown) or recycle into storage tank 4 for use as feedstock in a subsequent process cycle. The depressurization step is continued until the reactor reaches the second predetermined pressure.

Reactor 1 is then subjected to one period of the purge I step which comprises the second step of the claimed PSA process. Reactor 1 is countercurrently purged at the second pressure with a weakly adsorbing purge fluid with respect to the adsorbent. Upon opening valves 14a and 15a while valves 25a and 32a remain in the closed position, weakly absorbing purge fluid from an external source passes through pump 31 via line 30 and exits pump 31 at the second pressure to proceed via manifold D, line 15 and line 40 into the exit end of reactor 1. A mixture comprising unreacted feedstock, weakly adsorbing purge fluid, a portion of $CO_2$ and a portion of Product D is withdrawn from reactor 1 via line 11, line 14 and manifold C and is collected in separator 35. This mixture may be used as fuel, discharged for use outside the process or separated in separator 35 to form a stream of weakly adsorbing purge gas. A portion of the weakly adsorbing purge fluid may be transferred through line 34 into storage tank 33 for future use. Upon demand via opening valve 32a, weakly adsorbing purge fluid may be drawn to pump 31 via lines 32 and 30 for use in subsequent process cycles.

Reactor 1 is then subjected to one period of the purge II step wherein reactor 1 is countercurrently purged with the less adsorbable product, Product D. Upon opening valves 14a and 15a while valves 25a and 32a remain in the closed position, the less adsorbable product from an external source passes through pump 31 via line 30 and exits pump 31 at the second pressure to proceed via manifold D, line 15 and line 40 into the exit end of reactor 1. A mixture comprising unreacted feedstock, a portion of $CO_2$ and a portion of Product D is withdrawn from reactor 1 via line 11, line 14 and manifold C and is collected in separator 35. This mixture may be used as fuel, discharged for use outside the process or separated in separator 35 to form a stream of the weakly adsorbing purge fluid which may be transferred through line 34 into storage tank 33 for future use. Upon demand via opening valve 32a, such weakly adsorbing purge fluid may be drawn to pump 31 via lines 32 and 30 for use in subsequent process cycles. Thus, the second step of the claimed PSA process has been completed wherein $CO_2$ has been desorbed from the $CO_2$ laden alumina adsorbent by the weakly adsorbing fluid.

The final step of the integrated process cycle involves a single sequence of the pressurization step wherein reactor 1 is countercurrently pressurized from the second pressure to the first pressure with Product D prior to commencing another process cycle within the reactor. Specifically, upon opening valve 15a while valves 11a, 13a, 14a, 25a and 32a remain in the closed position, the less adsorbable product passes through pump 31 via line 30 and exits pump 31 at the second pressure to proceed via manifold D, line 15 and line 40 into the exit end of reactor 1. This step is stopped when reactor 1 reaches the first pressure.

The process proceeds through additional cycles according to the above-mentioned steps enumerated in Table 1. While the sequence periods are depicted as being of equal length, this is neither required or necessary. The times will be set by allowable maximum gas flow rates, valve and line sizes and the properties of the adsorbent used. Alternate routines may be employed for establishing the duration of each of the cycle steps. For example, the end of a particular step may be determined by other techniques known in the art such as by analysis of the composition of the reactor effluent.

Reactors 1 and 2 depict conventional stainless steel shell-and-tube reactor. An admixture of the catalyst suitable for catalyzing the desired equilibrium controlled reaction and the alumina adsorbent for preferentially adsorbing $CO_2$ is loaded into a plurality of tubes within the reactor. A plurality of shells formed between adjacent tubes receives a heat transfer fluid capable of phase change which is selected to undergo such phase change at the desired operating temperature of the desired equilibrium controlled reaction being carried out in the tubes.

The reactors are preferentially designed to operate net endothermic reactions although the reactor is also well suited to operate net exothermic equilibrium controlled reactions. Net endothermic reactions are defined as those equilibrium controlled reactions in which heat must be added to the reactor to carry out the sorpreaction step because the endothermic heat of reaction of the equilibrium controlled reaction is greater than the energy liberated by the exothermic adsorption of the more adsorbable product.

Several fluids capable of phase change under reaction conditions are commercially available and can be selected by one of ordinary skill in the art without undue experimentation. Examples of such fluids include (i) Syltherm 800 from Dow Chemical Company (highly stable polydimethylsiloxane), (ii) Dowtherm A from Dow Chemical Company (a eutectic mixture of biphenyl oxide and diphenyl oxide)and (iii) Therminol VP-1 from Monsanto Company (eutectic mixture of 26.5% biphenyl oxide and 73.5% diphenyl oxide). These HTFs are capable of operating with film temperatures in excess of 425° C. For lower temperature operation, steam may be used as the phase change fluid which is capable of phase change. The maximum temperature for using steam in this application is about 300° C.

The embodiment depicted in the FIGURE is particularly suited toward practicing the steam-methane reforming reaction for producing hydrogen wherein the feedstock for the steam-methane reforming reaction comprises water and methane in a stoichiometric ratio of water to methane ranging from 1.5 to 30 when the more adsorbable product is primarily $CO_2$ and from 1 to 1.5 when the more adsorbable product is primarily carbon monoxide. The less adsorbable product is hydrogen in both cases. Reaction conditions include a temperature ranging from 200° to 600° C., the first $CO_2$ partial pressure which ranges from 0.1 to 5.0 bar and the second $CO_2$ partial pressure which ranges from 0 bar to 2 bar. The weakly adsorbing purge fluid is selected from the group consisting of methane, steam, hydrogen and nitrogen.

Suitable catalysts for conducting the steam-methane reforming reaction include conventional steam-methane reforming and prereforming catalysts such as nickel-alumina, nickel-magnesium alumina and the noble metal catalysts. The adsorbent can be selected to adsorb carbon monoxide, $CO_2$ or a mixture of carbon monoxide and $CO_2$. For example, preferential adsorbents for $CO_2$ include the metal oxides and mixed metal oxides of magnesium, manganese, lanthanum and calcium and the clays minerals such as sepiolite and dolomite. Adsorbents which are selective toward carbon monoxide include $Cu^{+1}$ on silica-alumina and $Ag^{+1}$ on silica-alumina as described in U.S. Pat. Nos. 4,019,879 and 4,019,880.

The ratio by weight of catalyst and alumina adsorbent can be widely varied depending upon the particular requirements of a particular catalyzed reaction. No special techniques are required to prepare the admixture of catalyst and adsorbent to be placed in each reactor. The catalyst and adsorbent are simply mixed together by conventional means in order to disperse the catalyst and adsorbent. The catalyst and adsorbent to be mixed should desirably possess compatible average particle sizes such that the catalyst and adsorbent do not segregate into domains during operation of the process.

EXPERIMENTAL SECTION

The following examples are provided to further illustrate Applicants' PSA process and the alumina adsorbents utilized in the process. The examples are illustrative and are not intended to limit the scope of the appended claims.

Example 1

Preparation and Characterization of a $CaO/Al_2O_3$ Adsorbent

Three samples of a $CaO/Al_2O_3$ adsorbent were prepared by impregnation of 0.5 M, 2.0 M and 5.0 M aqueous solutions of $Ca(NO_3)_2$ into individual 3 g samples of Alcoa F-200 alumina beads (⅛"). The F-200 alumina was heated at 400° C. for 4 hours prior to impregnation. The nitrate solution was added to test tubes containing the alumina to the point of incipient wetness. After 1 hour the excess liquid was decanted and the wet beads were placed into an oven and dried at 120° C. for 16 hours. Samples of the resulting alumina adsorbents were heated at 500° C. for 2 hours prior to measuring the $CO_2$ capacity of the resulting adsorbents. The samples prepared from the 0.5 M, 2.0 M and 5.0 M solutions were characterized by elemental analysis to contain 4.73, 7.11 and 11.08 weight percent CaO, respectively. These materials were analyzed by thermogravimetric analysis (TGA) to have $CO_2$ capacities of 0.19, 0.22 and 0.32 mmol $CO_2$/g, respectively, at 400° C. under dry $CO_2/N_2$ cycling conditions ($P_{CO2}$=500 Torr). These results are summarized as Runs 1 through 3 of Table 2.

Example 2

Preparation and Characterization of a $Na_2O/Al_2O_3$ Adsorbent

Three samples of a $Na_2O/Al_2O_3$ adsorbent were prepared by impregnation of 0.5 M, 2.0 M and 5.0 M aqueous solutions of $NaNO_3$ into individual 3 g samples of Alcoa F-200 alumina beads (⅛"). The $Al_2O_3$ was impregnated and heated according to the procedure described in Example 1. The three alumina adsorbents resulting from impregnation with the 0.5 M, 2.0 M and 5.0 M solutions were characterized by elemental analysis to contain 1.23, 3.44 and 6.51 weight percent $Na_2O$, respectively. These materials were analyzed by TGA to have capacities of 0.11, 0.25 and 0.29 mmol $CO_2$/g, respectively, at 400° C. under dry $CO_2/N_2$ cycling conditions ($P_{CO2}$=500 Torr). These results are summarized as Runs 4 through 6 of Table 2.

Example 3

Preparation and Characterization of a $Na_2CO_3/Al_2O_3$ Adsorbent

Three samples of a $Na_2CO_3/Al_2O_3$ adsorbent were prepared by impregnation of 0.5 M, 2.0 M and 5.0 M aqueous solutions of $NaCH_3CO_2$ into individual 3 g samples of Alcoa F-200 alumina beads (⅛"). The $Al_2O_3$ was impregnated and heated according to the procedure described in Example 1. The three adsorbents resulting from impregnation with 0.5 M, 2.0 M and 5.0 M solutions were characterized by elemental analysis to contain 2.32, 7.49 and 19.57 weight percent $Na_2CO_3$, respectively. These materials were analyzed by TGA to have capacities of 0.11, 0.23 and 0.28 mmol $CO_2$/g, respectively, at 400° C. under dry $CO_2/N_2$ cycling conditions ($P_{CO2}$=500 Torr). These results are summarized as Runs 7 through 9 of Table 2.

Example 4

Preparation and Characterization of a $K_2O/Al_2O_3$ Adsorbent

Three samples of a $K_2O/Al_2O_3$ adsorbent were prepared by impregnation of 0.5 M, 2.0 M and 5.0 M aqueous solutions of $KNO_3$ into individual 3 g samples of Alcoa F-200 alumina beads (⅛"). The $Al_2O_3$ was impregnated and heated according to the procedure described in Example 1. The three adsorbents resulting from impregnation with 0.5 M, 2.0 M and 5.0 M solutions were characterized by elemental analysis to contain 1.77, 5.79 and 12.17 weight percent $K_2O$, respectively. These materials were analyzed by TGA to have capacities of 0.13, 0.23 and 0.19 mmol $CO_2$/g, respectively, at 400° C. under dry $CO_2/N_2$ cycling conditions ($P_{CO2}$=500 Torr). These results are summarized as Runs 10 through 12 of Table 2.

Example 5

Preparation and Characterization of a $SrO/Al_2O_3$ Adsorbent

Three samples of a $SrO/Al_2O_3$ adsorbent were prepared by impregnation of 0.5 M, 2.0 M and≈4.0 M aqueous solutions of $Sr(NO_3)_2$ into individual 3 g samples of Alcoa F-200 alumina beads (⅛"). The $Al_2O_3$ was impregnated and heated according to the procedure described in Example 1. The three adsorbents resulting from impregnation with 0.5 M, 2.0 M and 4.0 M solutions were characterized by elemental analysis to contain 3.84, 10.43 and 14.43 weight percent SrO, respectively. These materials were analyzed by TGA to have capacities of 0.14, 0.21 and 0.22 mmol $CO_2$/g, respectively, at 400° C. under dry $CO_2/N_2$ cycling conditions ($P_{CO2}$=500 Torr). These results are summarized as Runs 13 through 15 of Table 2.

Example 6

Preparation and Characterization of a $Li_2O/Al_2O_3$ Adsorbent

Two samples of a $Li_2O/Al_2O_3$ adsorbent were prepared by impregnation of 0.5 M aqueous solutions of $LiNO_3$ into two 3 g samples of Alcoa F-200 alumina beads (⅛"). The $Al_2O_3$ was impregnated and heated according to the procedure described in Example 1. One of the samples was impregnated a second time with $LiNO_3$ and heated again as described in Example 1. In this manner two different loading levels of $Li_2O$ and $Al_2O_3$ were prepared corresponding to a single and double impregnation. The supported oxides were characterized by TGA to have capacities of 0.20, and 0.52 mmol $CO_2$/g, respectively, at 400° C. under dry $CO_2/N_2$ cycling conditions ($P_{CO2}$=500 Torr). Results for the respective samples are summarized as Runs 16 and 17 of Table 2.

Example 7

Preparation and characterization of a $Li_2CO_3/Al_2O_3$ Absorbent

A sample of a $Li_2CO_3/Al_2O_3$ adsorbent was prepared by impregnation of a 10.0 M aqueous solution of $Li_2CH_3CO_2$ into a 5 g sample of Alcoa F-200 alumina beads (⅛"). The $Al_2O_3$ was impregnated and heated according to the procedure described in Example 1. The resulting adsorbent was characterized by TGA to have a capacity of 0.29 mmol $CO_2$/g, respectively, at 400° C. under dry $CO_2/N_2$ cycling conditions ($P_{CO2}$=500 Torr) and the elemental analysis demonstrated that the adsorbent contained 14.24 weight percent $Li_2CO_3$. The Result for this sample is summarized as Run 18 of Table 2.

Example 8

$CO_2$ adsorptive properties of F-200 $Al_2O_3$ support and basic metal oxides

The $CO_2$ capacities of Alcoa F-200 $Al_2O_3$, CaO, SrO and $Na_2O$ were determined by TGA under dry $CO_2$/dry $N_2$ cycling conditions. The metal oxides were produced by decomposition of the corresponding metal carbonates or nitrates. The F-200 $Al_2O_3$ had a capacity of 0.06 mmol $CO_2$/g at 400° C. CaO, SrO and $Na_2O$ had capacities of 0.05, <0.01 and <0.02 mmol/g, respectively under similar conditions. This clearly illustrates the synergistic effect that the supported oxides have with respect to $CO_2$ adsorption relative the adsorptive properties of the constituent metal oxides or untreated alumina. The results for samples are presented as Runs 19 through 22 of Table 2.

TABLE 2

| Run | Adsorbent on F-200 Alcoa Alumina | Impregnation Solution | pH of Impregnation Solution | Reversible Capacity at 400° C. (mmol/g) |
|---|---|---|---|---|
| 1 | 4.73 wt. % CaO | 0.50 M $Ca(NO_3)_2$ | 5.61 | 0.19 |
| 2 | 7.11 wt. % CaO | 2.0 M $Ca(NO_3)_2$ | 5.40 | 0.22 |
| 3 | 11.08 wt. % CaO | 5.0 M $Ca(NO_3)_2$ | 4.77 | 0.32 |
| 4 | 1.23 wt. % $Na_2O$ | 0.50 M $NaNO_3$ | 5.25 | 0.11 |
| 5 | 3.44 wt. % $Na_2O$ | 2.0 M $NaNO_3$ | — | 0.25 |
| 6 | 6.51 wt. % $Na_2O$ | 5.0 M $NaNO_3$ | 5.51 | 0.29 |
| 7 | 2.32 wt. % $Na_2CO_3$ | 0.50 M $NaCH_3CO_2$ | 7.58 | 0.11 |

TABLE 2-continued

| Run | Adsorbent on F-200 Alcoa Alumina | Impregnation Solution | pH of Impregnation Solution | Reversible Capacity at 400° C. (mmol/g) |
|---|---|---|---|---|
| 8 | 7.49 wt. % $Na_2CO_3$ | 2.0 M $NaCH_3CO_2$ | 7.82 | 0.23 |
| 9 | 19.57 wt. % $Na_2CO_3$ | 5.0 M $NaCH_3CO_2$ | — | 0.28 |
| 10 | 1.77 wt. % $K_2O$ | 0.50 M $KNO_3$ | 6.23 | 0.13 |
| 11 | 5.79 wt. % $K_2O$ | 2.0 M $KNO_3$ | 6.70 | 0.23 |
| 12 | 12.17 wt. % $K_2O$ | 5.0 M $KNO_3$ | 7.20 | 0.19 |
| 13 | 3.84 wt. % SrO | 0.50 M $Sr(NO_3)_2$ | — | 0.14 |
| 14 | 10.43 wt. % SrO | 2.0 M $Sr(NO_3)_2$ | — | 0.21 |
| 15 | 14.43 wt. % SrO | 4.0 M $Sr(NO_3)_2$ | — | 0.22 |
| 16 | 4.95 wt. % $Li_2O$ | 1 × 5.0 M $LiNO_3$ | 5.95 | 0.20 |
| 17 | 8.94 wt. % $Li_2O$ | 2 × 5.0 M $LiNO_3$ | 5.95 | 0.52 |
| 18 | 14.24 wt. % $Li_2CO_3$ | 10.0 M $LiCH_3CO_2$ | — | 0.29 |
| 19 | F-200 Alumina | N.A. | N.A. | 0.06 |
| 20 | CaO | N.A. | N.A. | 0.05 |
| 21 | SrO | N.A. | N.A. | <0.02 |
| 22 | $Na_2O$ | N.A. | N.A. | <0.02 |

Example 9

Preparation and Characterization of a $K_2CO_3/Al_2O_3$ Adsorbent

Three samples of a $K_2CO_3/Al_2O_3$ adsorbent were prepared by impregnating individual 3 g samples of Alcoa-F-200 alumina beads (⅛") with 0.5 M, 2.0 M and 5.0 M aqueous solutions of $K_2CO_3$. The F-200 alumina was heated at 400° C. for 4 hours prior to impregnation. The carbonate solution was added to test tubes containing the activated alumina to the point of incipient wetness. After 1 hour the excess liquid was decanted and the wet beads were placed into an oven and dried at 120° C. for 16 hours. Once dried, the three alumina adsorbents supported carbonates resulting from impregnation with 0.5 M, 2.0 M and 5.0 M solutions were characterized by elemental analysis to contain 5.39, 23.35 and 37.55 weight percent $K_2CO_3$, respectively. These materials were analyzed by TGA to have capacities of 0.21, 0.31 and 0.34 mmol $CO_2$/g, respectively, at 400° C. under dry $CO_2/N_2$ cycling conditions ($p_{CO2}$=500 Torr).

Example 10

Effect of Low Humidity on $CO_2$ Capacity of a $K_2CO_3/Al_2O_3$ Adsorbent

A $K_2CO_3/Al_2O_3$ adsorbent prepared as described in Example 9 was tested to determine the effect of low moisture levels on the $CO_2$ capacity of the alumina adsorbent. $CO_2$ capacity of the sample was tested by TGA under dry $CO_2$/dry $N_2$ cycling conditions, then compared with the $CO_2$ capacity measured under humid $CO_2$/dry $N_2$ cycling conditions. The humid $CO_2$ contained 20 Torr of water vapor pressure, which was generated by saturating the dry $CO_2$ stream with room temperature water vapor. The $K_2CO_3/Al_2O_3$ adsorbent was shown to have an identical capacity of 0.24 mmol $CO_2$/g at 400° C. whether cycled under humid or dry conditions. This demonstrates that low levels of humidity do not affect the $CO_2$ capacity of a $K_2CO_3/Al_2O_3$ adsorbent. The results are depicted in Table 3.

TABLE 3

| composition | $CO_2$ capacity at 400 C. under dry conditions (mmol/g)[1] | $CO_2$ capacity at 400 C. under low humidity conditions (mmol/g)[2] | $CO_2$ capacity at 400 C. under high humidity conditions (mmol/g)[3] |
|---|---|---|---|
| $K_2CO_3/Al_2O_3$ | 0.24 | 0.24 | 0.21 |
| $CaO/Al_2O_3$ | 0.27 | 0.26 | no data |
| MgO | 0.13 | 0.01 | no data |

[1]measured on TGA under dry $CO_2$ (500 Torr)/dry $N_2$ cycling conditions
[2]measured on TGA under 20 Torr $H_2O$-500 Torr $CO_2$/dry $N_2$ cycling conditions
[3]measured on laboratory desorption apparatus under 10 atm $H_2O$-1.5 atm $CO_2$/dry $N_2$ cycling conditions Example 11

Effect of High Humid capacity on $CO_2$ Capacity of a $K_2CO_3/Al_2O_3$ Adsorbent A $K_2CO_3/Al_2O_3$ adsorbent prepared as described in Example 9 was loaded into a cell contained in a box furnace. The sample was heated at 400° C. for two hours under a $N_2$ purge, then saturated by purging with a binary gaseous mixture of 10 atmospheres of $H_2O$ and 0.30 atmospheres of $CO_2$ at 400° C. for 1 hour. The adsorbed $CO_2$ and $H_2O$ were desorbed at 400° C. and the evolved gases were quantitated by an in-line mass spectrometer. The $K_2CO_3/Al_2O_3$ adsorbent was determined to have a capacity of 0.13 mmol $CO_2$/g of adsorbent in the presence of 10 atmospheres of steam. In a similar test using 10 atmospheres of $H_2O$ and 1.5 atmospheres of $CO_2$ the same material had a capacity of 0.21 mmol/g. Under 1 atmosphere of dry $CO_2$ the sample had a capacity of 0.37 mmol/g. These tests illustrate that $K_2CO_3/Al_2O_3$ is able to maintain a significant $CO_2$ capacity in the presence of a large molar excess of $H_2O$ at 400° C. The results are depicted in Table 3.

Example 12

Effect of Low Humidity on $CO_2$ Capacity of $CaO/Al_2O_3$ $CaO/Al_2O_3$ prepared according to the procedure of Example 1 from impregnation of the $Al_2O_3$ with 5.0 M $Ca(NO_3)_2$ was tested to determine the effect of low moisture levels on the $CO_2$ capacity. The $CO_2$ capacity of the sample was tested by TGA under dry $CO_2$/dry $N_2$ cycling conditions, then compared with the $CO_2$ capacity obtained under humid $CO_2$/dry $N_2$ cycling conditions. The humid $CO_2$ contained 20 Torr of water vapor pressure, which was generated by saturating the dry $CO_2$ stream with room temperature water vapor. In this manner the $CaO/Al_2O_3$ adsorbed was shown to have capacities of 0.27 and 0.26 mmol $CO_2$/g when tested under dry and low humidity conditions at 400° C., respectively. This experiment demonstrates that low levels of humidity do not significantly affect the $CO_2$ capacity of $CaO/Al_2O_3$. The results are depicted in Table 3.

Example 13

Preparation and Characterization of MgO

MgO was prepared by thermally decomposing $MgCO_3$ at 500° C. under flowing $N_2$ for 2 hours. This material was analyzed by TGA to have a $CO_2$ capacity of 0.15 mmol/g at 400° C. under dry $CO_2/N_2$ cycling conditions ($P_{CO2}$=500 Torr). The results are depicted in Table 3.

Example 14

Effect of Low Humidity on $CO_2$ Capacity of MgO

MgO was prepared as described in Example 14. The effect of low moisture levels on the $CO_2$ capacity of MgO was determined by measuring its $CO_2$ capacity by TGA under dry $CO_2$/dry $N_2$ cycling conditions, then comparing the $CO_2$ capacity under humid $CO_2$/dry $N_2$ cycling conditions. The humid $CO_2$ contained 20 Torr of water vapor pressure, which was generated by saturating the dry $CO_2$ stream with room temperature water vapor. MgO was shown to have capacities of 0.134 and 0.013 mmol $CO_2$/g, when tested under dry and low humidity conditions at 400° C., respectively. This demonstrated that low levels of humidity reduced the $CO_2$ capacity of MgO by 90%. The results are depicted in Table 3.

While the invention has been described with reference to various general embodiments and the preferred embodiment, those of ordinary skill in the art will recognize that many modifications and variations thereof are possible within the scope of the invention.

We claim:

1. A pressure swing adsorption process for absorbing $CO_2$ from a water-containing gaseous mixture having a first $CO_2$ partial pressure comprising introducing the water-containing gaseous mixture into a reactor maintained at a selected temperature ranging from 100° C. and 500° C., which contains an alumina adsorbent formed by depositing a solution of a compound comprising a cation selected from an alkali metal, an alkaline earth metal or ammonium and an anion selected from an hydroxide, a carbonate, a bicarbonate, an acetate, a phosphate, a nitrate or an organic acid salt having a pH of 3.0 or more onto alumina and heating the alumina to a temperature ranging from 100° C. and 600° C., to adsorb $CO_2$ to provide a $CO_2$ laden alumina adsorbent and a $CO_2$ depleted gaseous mixture and contacting the $CO_2$ laden adsorbent residing in the reactor maintained at the selected temperature ranging from 100° C. and 500° C., with a weakly adsorbing purge fluid having a second $CO_2$ partial pressure which is lower than the first $CO_2$ partial pressure to desorb $CO_2$ from the $CO_2$ laden alumina adsorbent.

2. The process according to claim 1 wherein the alkali metal cation is selected from the group consisting of lithium, sodium, potassium, cesium and rubidium.

3. The process according to claim 1 wherein the alkaline earth metal cation is selected from the group consisting of calcium, strontium and barium.

4. The process according to claim 1 wherein the compound is selected from the group consisting of $Ca(NO_3)_2$, $NaNO_3$, $NaCH_3CO_2$, $KNO_3$, $Sr(NO_3)_2$, $LiNO_3$, $K_2CO_3$ and $LiCH_3CO_2$.

5. The process according to claim 1 wherein the depositing of the solution having a pH of 3.0 or more is accomplished by impregnation.

6. The process according to claim 1 wherein the depositing of the solution having a pH of 3.0 or more is accomplished by vapor phase deposition.

7. The process according to claim 1 wherein the depositing of the solution having a pH of 3.0 or more is accomplished by dip coating.

8. The process according to claim 1 wherein the depositing of the solution having a pH of 3.0 or more is accomplished by spraying.

9. The process according to claim 1 wherein the weakly adsorbing purge fluid used to desorb $CO_2$ from the $CO_2$ laden alumina adsorbent comprises the $CO_2$ depleted gaseous mixture.

10. The process according to claim 1 wherein the weakly adsorbing purge fluid used to desorb $CO_2$ from the $CO_2$ laden alumina adsorbent comprises an inert gas.

11. The process according to claim 10 wherein the inert gas is selected from the group consisting of methane, nitrogen, helium and argon.

12. The process according to claim 1 wherein the water-containing gaseous mixture containing $CO_2$ contains up to 20,000 ppm $CO_2$.

13. The process according to claim 1 wherein the water-containing gaseous mixture containing $CO_2$ is a steam methane reformer effluent.

14. The process according to claim 13 wherein the first $CO_2$ partial pressure ranges from 0.1 to 5 bar and the second $CO_2$ partial pressure ranges from 0 bar to 2 bar.

15. The process according to claim 14 wherein the weakly adsorbing purge fluid used to desorb $CO_2$ from the $CO_2$ laden alumina adsorbent is selected from the group consisting of methane, hydrogen, helium, nitrogen and argon.

16. The process according to claim 1 wherein the water-containing gaseous mixture containing $CO_2$ is a flue gas.

17. The process according to claim 1 wherein the water-containing gaseous mixture containing $CO_2$ is an inert gas generator effluent.

18. The process according to claim 1 wherein the reactor is an isothermal fixed bed reactor or a tube and shell reactor.

* * * * *